(12) United States Patent
Sakikawa

(10) Patent No.: US 12,521,672 B2
(45) Date of Patent: Jan. 13, 2026

(54) WATER COLLECTING APPARATUS AND WATER COLLECTING METHOD

(71) Applicant: SHARP KABUSHIKI KAISHA, Sakai (JP)

(72) Inventor: Nobuki Sakikawa, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 401 days.

(21) Appl. No.: 18/021,224

(22) PCT Filed: Aug. 17, 2021

(86) PCT No.: PCT/JP2021/030010
§ 371 (c)(1),
(2) Date: Feb. 14, 2023

(87) PCT Pub. No.: WO2022/039149
PCT Pub. Date: Feb. 24, 2022

(65) Prior Publication Data
US 2023/0294040 A1    Sep. 21, 2023

(30) Foreign Application Priority Data
Aug. 18, 2020  (JP) ................................ 2020-138118

(51) Int. Cl.
*B01D 53/26*    (2006.01)
*B01D 53/04*    (2006.01)
(Continued)

(52) U.S. Cl.
CPC ....... *B01D 53/261* (2013.01); *B01D 53/0438* (2013.01); *B01J 20/22* (2013.01);
(Continued)

(58) Field of Classification Search
CPC .... B01D 53/02; B01D 53/04; B01D 53/0438; B01D 53/261; B01D 53/28;
(Continued)

(56) References Cited

U.S. PATENT DOCUMENTS

| | | | |
|---|---|---|---|
| 5,534,186 A * | 7/1996 | Walker | C08J 3/075 96/120 |
| 7,981,199 B2 * | 7/2011 | Burk | F25B 35/04 96/154 |
| 10,086,328 B2 | 10/2018 | Sakikawa et al. | |
| 10,265,656 B2 | 4/2019 | Sakikawa et al. | |
| 10,539,334 B2 | 1/2020 | Sakikawa et al. | |
| 11,845,039 B2 | 12/2023 | Reinders et al. | |

(Continued)

FOREIGN PATENT DOCUMENTS

| | | |
|---|---|---|
| JP | 2016-077967 A | 5/2016 |
| JP | 2016-198705 A | 12/2016 |

(Continued)

*Primary Examiner* — Frank M Lawrence, Jr.
(74) *Attorney, Agent, or Firm* — ScienBiziP, P.C.

(57) ABSTRACT

A water collecting apparatus (100) includes a moisture-absorbing material (10) and a heat-conducting member (20). The moisture-absorbing material (10) includes a polymer compound having a property in which a degree of hydrophilicity changes with temperature. The heat-conducting member (20) is disposed facing a portion of an outer surface of the moisture-absorbing material (10) and has thermal conductivity. The heat-conducting member (20) is preferably disposed so that another portion of the outer surface of the moisture-absorbing material (10) is left exposed. The portion of the outer surface of the moisture-absorbing material (10) and the other portion of the outer surface of the moisture-absorbing material (10) are collinearly positioned.

11 Claims, 14 Drawing Sheets

(51) Int. Cl.
*B01J 20/22* (2006.01)
*B01J 20/26* (2006.01)
*B01J 20/28* (2006.01)
*B01J 20/34* (2006.01)
*E03B 3/28* (2006.01)

(52) U.S. Cl.
CPC ..... *B01J 20/28035* (2013.01); *B01J 20/3425* (2013.01); *B01J 20/3483* (2013.01); *E03B 3/28* (2013.01); *B01D 2253/202* (2013.01); *B01D 2257/80* (2013.01); *B01D 2259/40098* (2013.01)

(58) Field of Classification Search
CPC .......... B01D 2253/202; B01D 2257/80; B01D 2259/40098; B01J 20/22; B01J 20/28035; B01J 20/3425; B01J 20/3483; B01J 20/24; B01J 20/267; B01J 20/28042; E03B 3/28
USPC .... 96/108, 126, 143, 146; 94/117, 121, 126; 34/80, 472, 473
See application file for complete search history.

(56) References Cited

U.S. PATENT DOCUMENTS

| | | | |
|---|---|---|---|
| 2007/0012186 A1* | 1/2007 | Wilson | B01D 46/0036 95/117 |
| 2016/0220951 A1 | 8/2016 | Reinders et al. | |
| 2017/0065930 A1* | 3/2017 | Sakikawa | B01D 53/263 |
| 2017/0266610 A1 | 9/2017 | Sakikawa et al. | |
| 2017/0276380 A1* | 9/2017 | Sakikawa | B01J 20/262 |
| 2018/0050298 A1 | 2/2018 | Sakikawa et al. | |
| 2019/0046918 A1* | 2/2019 | Reinders | B01D 53/28 |
| 2020/0363078 A1* | 11/2020 | Mulet | B01J 20/3433 |
| 2021/0069639 A1* | 3/2021 | Wang | B01J 20/0288 |
| 2023/0084610 A1* | 3/2023 | Wong | B01D 53/28 95/121 |
| 2024/0109025 A1* | 4/2024 | Zhao | B01J 20/3272 |

FOREIGN PATENT DOCUMENTS

| | | |
|---|---|---|
| WO | 2015037996 A1 | 3/2015 |
| WO | 2015/170501 A1 | 11/2015 |
| WO | 2016/035403 A1 | 3/2016 |
| WO | 2016035409 A1 | 3/2016 |
| WO | 2016/068129 A1 | 5/2016 |

* cited by examiner

WATER COLLECTING APPARATUS AND WATER COLLECTING METHOD

TECHNICAL FIELD

The present invention relates to a water collecting apparatus and a water collecting method.

BACKGROUND ART

PTL 1 discloses a water collecting apparatus.

The water collecting apparatus described in PTL 1 includes a moisture-absorbing unit and an air-blowing fan. The moisture-absorbing unit includes an element constituted by a base material and a heater. The base material is provided with a layered body formed by layering a polymeric moisture-absorbing material. The heater is provided in contact with the base material. The moisture-absorbing unit is rotatably supported. A region in which the moisture-absorbing unit rotates is divided into a moisture absorption area positioned in an upper portion of the water collecting apparatus and a release area positioned in a lower portion of the water collecting apparatus. When the element is positioned in the moisture absorption area during rotation of the moisture-absorbing unit, the heater is de-energized and an air current generated by the air-blowing fan is applied to the polymeric moisture-absorbing material. As a result, moisture in the air is supplied to the polymeric moisture-absorbing material. In contrast, when the element is positioned in the release area during rotation of the moisture-absorbing unit, the heater is energized. As a result, the polymeric moisture-absorbing material is heated by the heater, and moisture is released from the polymeric moisture-absorbing material.

CITATION LIST

Patent Literature

PTL 1: JP 2016-198705 A

SUMMARY OF INVENTION

Technical Problem

However, to move the element to the moisture absorption area (area that comes into contact with the air current from the air-blowing fan), a rotation mechanism for rotating the moisture-absorbing unit must be provided. Further, to supply moisture to the polymeric moisture-absorbing material in the moisture absorption area and to release moisture from the polymeric moisture-absorbing material in the release area, an interlocking mechanism for turning energization of the heater on and off in accordance with the area (moisture absorption area or release area) where the heater is positioned during rotation of the moisture-absorbing unit must be provided. As a result, because the rotating mechanism and the interlocking mechanism are required, a structure of the water collecting apparatus is complex.

An object of the present invention is to provide a water collecting apparatus that can collect moisture with a simple configuration, and a water collecting method.

Solution to Problem

According to a first aspect of the present application, a water collecting apparatus includes a moisture-absorbing material and a heat-conducting member. The moisture-absorbing material includes a polymer compound having a property in which a degree of hydrophilicity changes with temperature. The heat-conducting member is disposed facing a portion of an outer surface of the moisture-absorbing material and has thermal conductivity.

According to a second aspect of the present application, a water collecting apparatus includes a moisture-absorbing material and a light source. The moisture-absorbing material includes a polymer compound having a property in which a degree of hydrophilicity changes with temperature. The light source is configured to irradiate the moisture-absorbing material with light. The moisture-absorbing material includes a photothermal conversion body configured to convert light into heat.

According to a third aspect of the present application, a water collecting apparatus includes a moisture-absorbing material and a light source. The moisture-absorbing material includes a photoresponsive polymer compound having a property in which a degree of hydrophilicity changes with light. The light source is configured to irradiate the moisture-absorbing material with light.

According to a fourth aspect of the present application, in a water collecting method, a moisture-absorbing material is used. The moisture-absorbing material includes a polymer compound having a property in which a degree of hydrophilicity changes with temperature. The water collecting method includes facing a heat-conducting member toward a portion of an outer surface of the moisture-absorbing material. The water collecting method includes causing the moisture-absorbing material to absorb moisture. The water collecting method includes decreasing the degree of hydrophilicity of the polymer compound by heating the heat-conducting member. The water collecting method includes releasing the moisture from the moisture-absorbing material.

Advantageous Effects of Invention

According to the present invention, moisture can be collected with a simple configuration.

DESCRIPTION OF EMBODIMENTS

Figure 1:
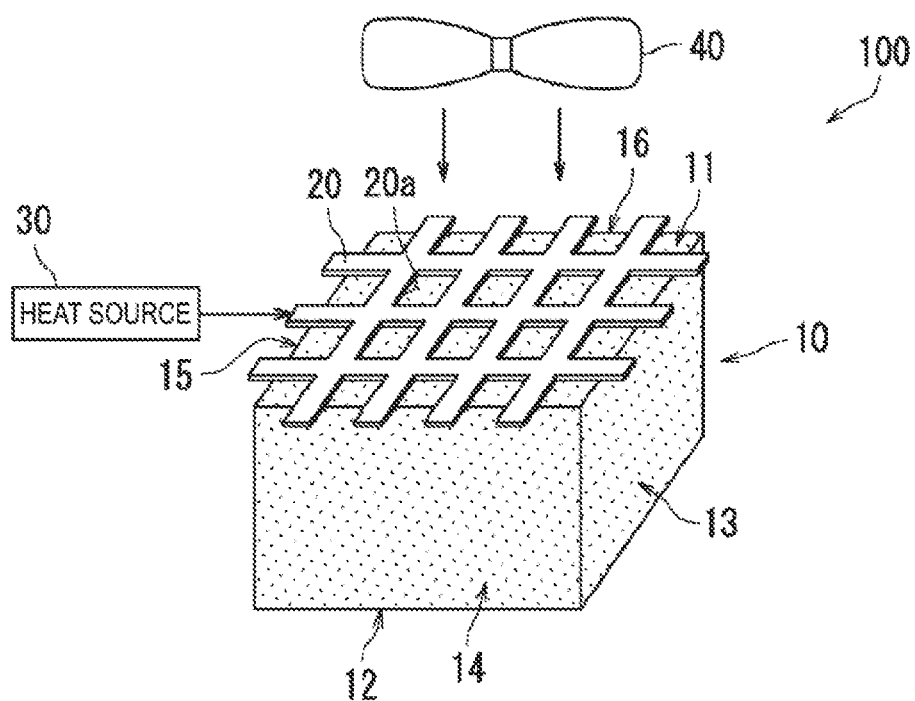
FIG. 1 is schematic view of a water collecting apparatus according to a first embodiment of the present invention.

Embodiments of the present invention will be described with reference to the drawings. Note that, in the drawings, the same or equivalent components are denoted by the same reference numerals and signs, and description thereof will not be repeated.

First Embodiment

A water collecting apparatus 100 according to a first embodiment of the present invention will now be described with reference to FIG. 1. FIG. 1 is schematic view of the water collecting apparatus 100 according to the first embodiment of the present invention. The water collecting apparatus 100 is an apparatus that collects water.

As illustrated in FIG. 1, the water collecting apparatus 100 includes a moisture-absorbing material 10, a heat-conducting member 20, a heat source 30, and an air-blowing unit 40.

The moisture-absorbing material 10 reversibly absorbs moisture (water vapor) in air and releases the absorbed moisture. The moisture-absorbing material 10 includes a predetermined polymer compound having a property in which a degree of hydrophilicity changes with temperature (heat). The predetermined polymer compound includes a temperature-responsive polymer having an affinity with water that reversibly changes in response to heat.

The temperature-responsive polymer is a polymer having a lower critical solution temperature (LCST). The temperature-responsive polymer becomes hydrophobic when equal to or greater than the lower critical solution temperature. The temperature-responsive polymer becomes hydrophilic at low temperatures less than the lower critical solution temperature. The temperature-responsive polymer is a polymer that becomes soluble in water when at low temperatures less than the lower critical solution temperature, but becomes hydrophobic and insoluble when equal to or greater than the lower critical solution temperature. The temperature-responsive polymer is more preferably porous, but need not necessarily be porous.

Examples of the temperature-responsive polymer include: poly(N-alkyl (meth)acrylamide) such as poly(N-isopropyl (meth)acrylamide), poly(N-normalpropyl (meth)acrylamide), poly(N-methyl (meth)acrylamide), poly(N-ethyl (meth)acrylamide), poly(N-normalbutyl (meth)acrylamide), poly(N-isobutyl (meth)acrylamide), or poly(N-t-butyl (meth)acrylamide); poly(N-vinyl alkylamide) such as poly (N-vinyl isopropylamide), poly(N-vinyl normalpropylamide), poly(N-vinyl normalbutylamide), poly(N-vinyl isobutylamide), or poly(N-vinyl-t-butylamide); poly(N-vinylpyrrolidone); poly(2-alkyl-2-oxazoline) such as poly(2-ethyl-2-oxazoline), poly(2-isopropyl-2-oxazoline), or poly(2-normalpropyl-2-oxazoline); polyvinyl alkyl ethers such as polyvinyl methyl ether and polyvinyl ethyl ether; copolymers of polyethylene oxide and polypropylene oxide; poly(oxyethylene vinyl ether); cellulose derivatives such as methyl cellulose, ethyl cellulose, hydroxypropyl cellulose, and hydroxypropyl methylcellulose; and copolymers of these polymers.

Further, the temperature-responsive polymer may be a cross-linked body of these polymers. In a case in which the temperature-responsive polymer is a cross-linked body, examples of such a cross-linked body include a polymer obtained by polymerizing, in the presence of a cross-linking agent, a monomer of: N-alkyl (meth)acrylamide such as N-isopropyl (meth)acrylamide, N-normalpropyl (meth) acrylamide, N-methyl (meth)acrylamide, N-ethyl (meth) acrylamide, N-normalbutyl (meth)acrylamide, N-isobutyl (meth)acrylamide, or N-t-butyl (meth)acrylamide; N-vinyl alkylamide such as N-vinyl isopropylamide, N-vinyl normalpropylamide, N-vinyl normal butylamide, N-vinyl isobutylamide, or N-vinyl-t-butylamide; a vinyl alkyl ether such as vinyl methyl ether or vinyl ethyl ether; ethylene oxide or propylene oxide; or 2-alkyl-2-oxazoline such as 2-ethyl-2-oxazoline, 2-isopropyl-2-oxazoline, or 2-normalpropyl-2-oxazoline, or two or more types of these monomers.

As the cross-linking agent, a conventionally known cross-linking agent may be appropriately selected and used, and for example, a cross-linkable monomer having a polymerizable functional group such as ethylene glycol di(meth) acrylate, propylene glycol di(meth)acrylate, N,N'-methylene bis(meth)acrylamide, tolylene diisocyanate, divinylbenzene, or polyethylene glycol di(meth)acrylate; glutaraldehyde; polyhydric alcohol; polyvalent amine; polyvalent carboxylic acid; metal ions such as calcium ions and zinc ions; and the like can be suitably used. These cross-linking agents may be used alone, or two or more of them may be used in combination.

The moisture-absorbing material 10 has a first state and a second state. The first state is a state in which the affinity of the predetermined polymer compound contained in the moisture-absorbing material 10 and water improves (degree of hydrophilicity improves), making moisture absorbable by the moisture-absorbing material 10. The moisture-absorbing material 10 in the first state swells when absorbing moisture, and thus more readily contains moisture. The second state is a state in which the affinity of the predetermined polymer compound contained in the moisture-absorbing material 10 and water deteriorates (degree of hydrophilicity deteriorates), resulting in the release of moisture from the moisture-absorbing material 10. The moisture-absorbing material 10 in the second state contracts, and thus less likely retains moisture. The moisture-absorbing material 10 is in the first state in a case in which the temperature of the moisture-absorbing material 10 is less than the lower critical solution temperature (about 40° C., for example), and is in the second state in a case in which the temperature of the moisture-absorbing material 10 is equal to or greater than the lower critical solution temperature.

In the first embodiment, the moisture-absorbing material 10 is configured to be in the first state at ambient temperature (a state in which atmospheric temperature is a standard temperature), and to be in the second state when heated from this state.

In the first embodiment, when the moisture-absorbing material 10 changes from the first state to the second state (transitions between phases), the moisture-absorbing material 10 is heated to a predetermined heating temperature. The predetermined heating temperature is a temperature (from 40° C. to less than 80° C., for example) at which the state of the moisture-absorbing material 10 is maintained in the second state and a large portion of the moisture contained in the moisture-absorbing material 10 does not become water vapor in a short time and is maintained in a liquid state. As a result, the moisture contained in the moisture-absorbing material 10 is released from the moisture-absorbing material 10 in a liquid state.

In the first embodiment, the moisture-absorbing material 10 is formed in a substantially prismatic shape. An outer surface of the moisture-absorbing material 10 includes a first surface 11, a second surface 12, a third surface 13, a fourth surface 14, a fifth surface 15, and a sixth surface 16. The first surface 11 constitutes a ceiling surface of the moisture-absorbing material 10. The second surface 12 constitutes a bottom surface of the moisture-absorbing material 10 and faces the first surface 11. The third surface 13 to the sixth surface 16 are positioned between the first surface 11 and the second surface 12. The third surface 13 and the fifth surface 15 constitute side surfaces of the moisture-absorbing material 10, and face each other. The fourth surface 14 constitutes a front surface of the moisture-absorbing material 10, and the sixth surface 16 constitutes a back surface of the moisture-absorbing material 10. The fourth surface 14 and the sixth surface 16 face each other. Note that a shape of the moisture-absorbing material 10 is not particularly limited.

The heat-conducting member 20 has thermal conductivity. The heat-conducting member 20 is formed of, for example, a metal. The heat-conducting member 20 is formed in a mesh shape. The heat-conducting member 20 includes a through-hole 20a passing through the heat-conducting member 20.

The heat-conducting member 20 is disposed facing a portion of the outer surface of the moisture-absorbing material 10. "Disposed facing" includes not only the heat-conducting member 20 being in contact with a portion of the outer surface of the moisture-absorbing material 10, but also the heat-conducting member 20 being disposed at a predetermined interval from a portion of the outer surface of the moisture-absorbing material 10. The predetermined interval is a distance at which the heat emitted from the heat-conducting member 20 is transmitted to the moisture-absorbing material 10. Further, the heat-conducting member 20 is not disposed facing another portion of the outer surface of the moisture-absorbing material 10, and is disposed so that the other portion of the outer surface of the moisture-absorbing material 10 is left exposed.

In the first embodiment, the heat-conducting member 20 is disposed facing the first surface 11 of the moisture-absorbing material 10. Further, in the first embodiment, on the outer surface of the moisture-absorbing material 10, the first surface 11, which is the surface (portion of the outer surface) facing the heat-conducting member 20, and the second surface 12, which is the surface (other portion of the outer surface) not facing the heat-conducting member 20 and thus left exposed, are disposed back to back and positioned collinearly.

The heat source 30 heats the heat-conducting member 20. The heat source 30 includes, for example, a heater. Note that the configuration of the heat source 30 is not particularly limited. For example, the heat source 30 may heat the heat-conducting member 20 by flowing current through the heat-conducting member 20 without using a heater.

The air-blowing unit 40 applies an air current to the moisture-absorbing material 10. The air-blowing unit 40 includes, for example, an air-blowing fan and a power source (motor, for example) that rotates the air-blowing fan. In the first embodiment, the air-blowing fan of the air-blowing unit 40 is disposed facing the heat-conducting member 20, and is configured to apply the air current to the moisture-absorbing material 10 through the through-hole 20a of the heat-conducting member 20. Note that the heater that is the heat source 30 may be disposed between the air-blowing unit 40 (air-blowing fan) and the heat-conducting member 20, and may be configured so that the air current from the air-blowing unit 40 flows in the order of the heater, the heat-conducting member 20, and the moisture-absorbing material 10.

Next, operation of the water collecting apparatus 100 will be described with reference to FIG. 2A to FIG. 4B. FIG. 2A to FIG. 4A are schematic views illustrating the operation of the water collecting apparatus 100. FIG. 2B to FIG. 4B are schematic views illustrating operation of the moisture-absorbing material 10. Note that, in FIG. 1 to FIG. 7B, the moisture-absorbing material 10 in the first state is denoted by dot hatching, and the moisture-absorbing material 10 in the second state is denoted by diagonal lines.

Figure 2A:
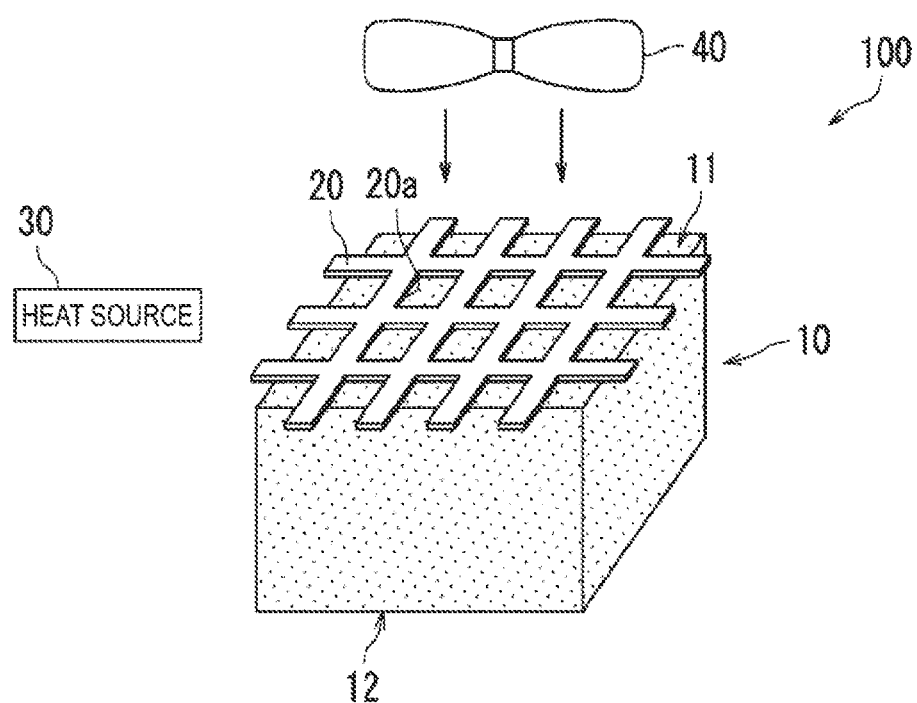
FIG. 2A is a schematic view illustrating operation of the water collecting apparatus.
Figure 2B:
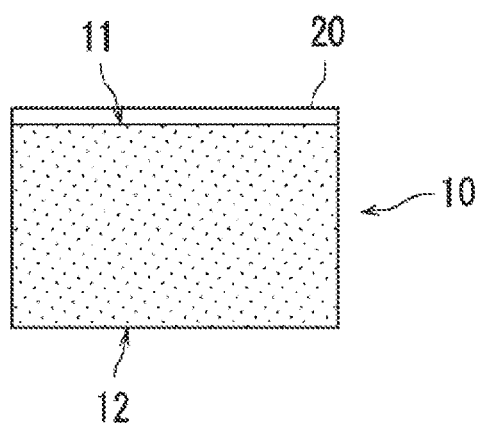
FIG. 2B is a schematic view illustrating operation of a moisture-absorbing material.

As illustrated in FIG. 2A and FIG. 2B, in a stage before the heat source 30 heats the heat-conducting member 20, the moisture-absorbing material 10 is in the first state. That is, the moisture-absorbing material 10 is in a state of high hydrophilicity, and in a state in which moisture is readily absorbed. When the moisture-absorbing material 10 is in the first state, the air current is applied to the moisture-absorbing material 10 by the air-blowing unit 40. As a result, moisture in the air can be effectively absorbed by the moisture-absorbing material 10.

Figure 3A:
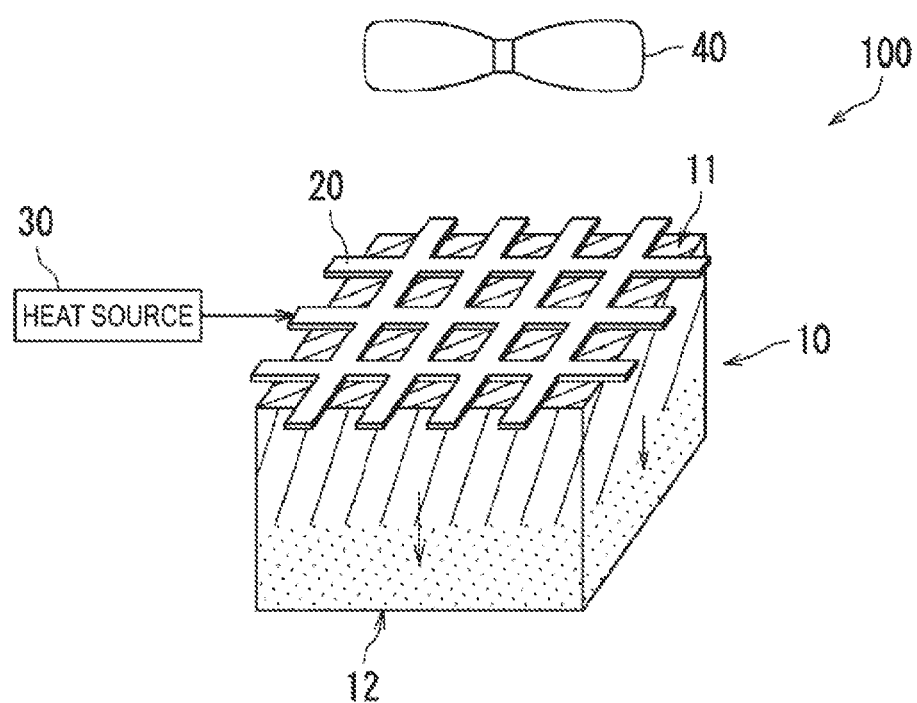
FIG. 3A is a schematic view illustrating operation of the water collecting apparatus.
Figure 3B:
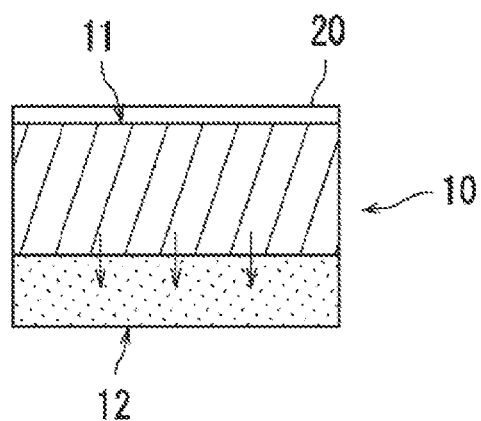
FIG. 3B is a schematic view illustrating operation of the moisture-absorbing material.

As illustrated in FIG. 3A and FIG. 3B, when the moisture-absorbing material 10 is in the first state in which the moisture-absorbing material 10 contains moisture, the heat-conducting member 20 is heated by the heat source 30. The heat-conducting member 20 is heated, thereby transmitting the heat of the heat-conducting member 20 to the moisture-absorbing material 10. At this time, the heat-conducting member 20 heats the moisture-absorbing material 10 to a predetermined heating temperature (from 40° C. to less than 80° C., for example). As a result, the degree of hydrophilicity of the predetermined polymer compound included in the moisture-absorbing material 10 decreases, thereby changing the moisture-absorbing material 10 from the first state to the second state.

The heat from the heat-conducting member 20 is gradually transmitted from the first surface 11 of the moisture-absorbing material 10 (surface of the moisture-absorbing material 10 on the side facing the heat-conducting member 20) toward the second surface 12 (surface of the moisture-absorbing material 10 on the side not facing the heat-conducting member 20). At this time, first, the temperature of the first surface 11 side of the moisture-absorbing material 10 rises to the predetermined heating temperature. Then, a region of the moisture-absorbing material 10 in which the temperature rises to the predetermined heating temperature gradually increases from the first surface 11 side toward the second surface 12 side. In this way, the moisture-absorbing material 10 gradually changes from the first state to the second state from the first surface 11 side toward the second surface 12 side. That is, the moisture-absorbing material 10 gradually changes from a state of high hydrophilicity to a state of low hydrophilicity from the first surface 11 side toward the second surface 12 side. Furthermore, the moisture-absorbing material 10 contracts when changing from the first state to the second state. As a result, in the moisture-absorbing material 10, the first surface 11 side becomes a skin layer (wall) that prevents a migration of water, and a region of the skin layer gradually expands toward the second surface 12 side, causing the moisture present on the first surface 11 side to migrate toward the second surface 12 side.

Figure 4A:
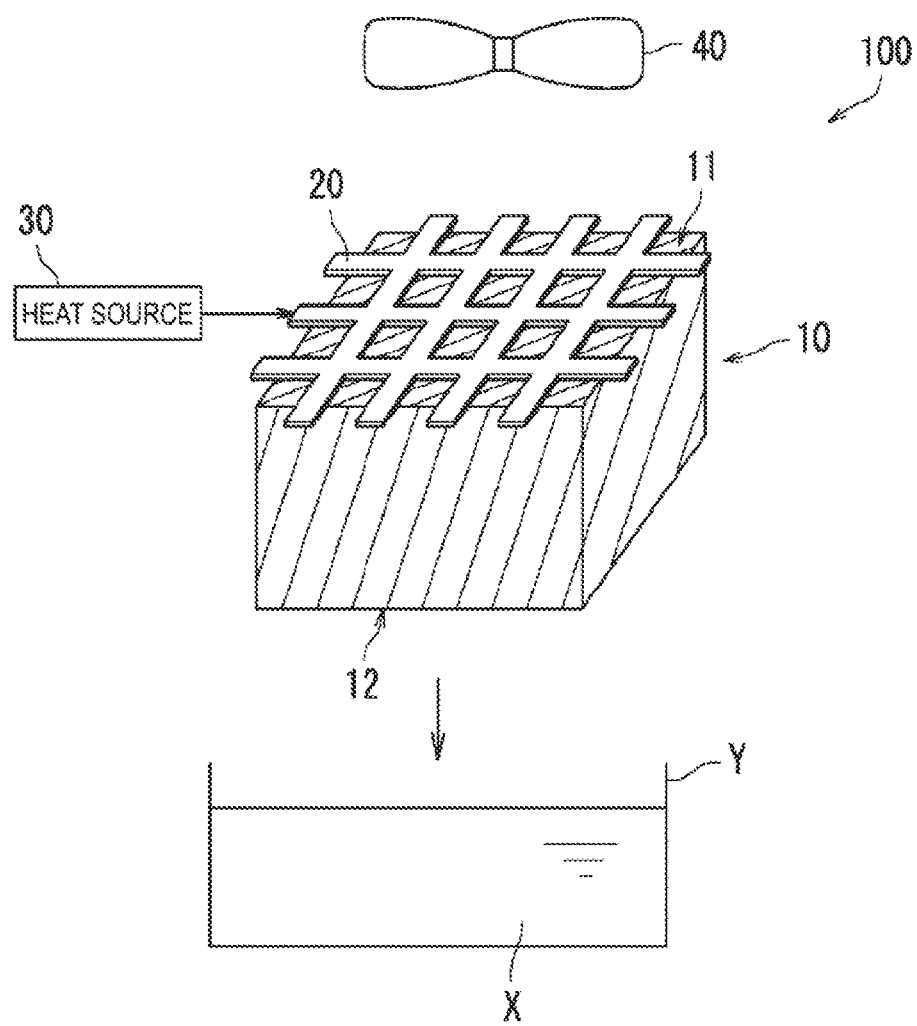
FIG. 4A is a schematic view illustrating operation of the water collecting apparatus.
Figure 4B:
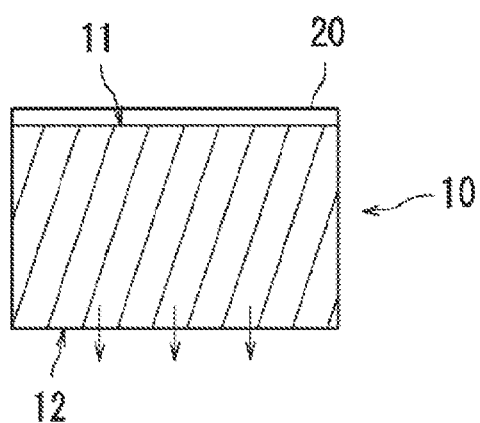
FIG. 4B is a schematic view illustrating operation of the moisture-absorbing material.

As illustrated in FIG. 4A and FIG. 4B, the heat-conducting member 20 is further heated by the heat source 30, causing the region of the moisture-absorbing material 10 that is in the second state (region of the skin layer) to expand to the second surface 12 side. That is, the region having low hydrophilicity expands to the second surface 12 side. As a result, the moisture contained in the moisture-absorbing material 10 is driven to the second surface 12 side of the moisture-absorbing material 10, advancing the collection of moisture. Subsequently, the moisture exudes from the second surface 12 as water droplets and is squeezed out and released from the second surface 12 to outside the moisture-absorbing material 10. Moisture X released from the second surface 12 of the moisture-absorbing material 10 is, for example, accommodated in a container Y disposed below the second surface 12.

As described above with reference to FIG. 1 to FIG. 4B, the heat-conducting member 20 is disposed facing a portion (first surface 11) of the outer surface of the moisture-absorbing material 10. Thus, the heat-conducting member 20 is heated, thereby heating the moisture-absorbing material 10 from the first surface 11 side and releasing the moisture from the second surface 12 (refer to FIG. 4A and FIG. 4B). As a result, the moisture can be released from the moisture-absorbing material 10 in a state in which the positions of each of the moisture-absorbing material 10 and the heat-conducting member 20 are fixed without moving the moisture-absorbing material 10 and the heat-conducting member 20. As a result, the apparatus configuration of the water collecting apparatus 100 can be simplified, making it possible to collect moisture using a simple configuration.

Further, when the moisture in the air is absorbed by the moisture-absorbing material 10 in the first state, the air current from the air-blowing unit 40 can be applied across the heat-conducting member 20 to the moisture-absorbing material 10 through the through-hole 20a. As a result, the heat-conducting member 20 and the air-blowing unit 40 (air-blowing fan) can be installed on the same side with respect to the moisture-absorbing material 10, making it possible to compactly configure the water collecting apparatus 100.

Further, the moisture-absorbing material 10 can be phase-transferred by the heating temperature of from 40° C. to less than 80° C. Accordingly, the water absorbed by the moisture-absorbing material 10 can be released from the moisture-absorbing material 10 at a low temperature compared to that of zeolite, silica gel, or the like. For example, a temperature of 200° C. or higher is required to release the water absorbed by zeolite from zeolite.

Note that a material of the heat-conducting member 20 is not particularly limited as long as a material has high thermal conductivity. For example, the heat-conducting member 20 may be formed of a resin having high thermal conductivity.

Note that, in the present embodiment, an orientation of the surface that releases the water (second surface 12) is downward, but the orientation of the surface that releases the water (second surface 12) is not limited to downward because the change from the first state to the second state of the moisture-absorbing material 10 is a driving force for water release. That is, the orientation of the surface that releases water (second surface 12) is not limited to the direction of gravity. The orientation of the surface that releases the water (second surface 12) may be upward or may be transverse. Preferably, the orientation of the surface that releases the water (second surface 12) is downward or transverse.

Second Embodiment

Figure 5:
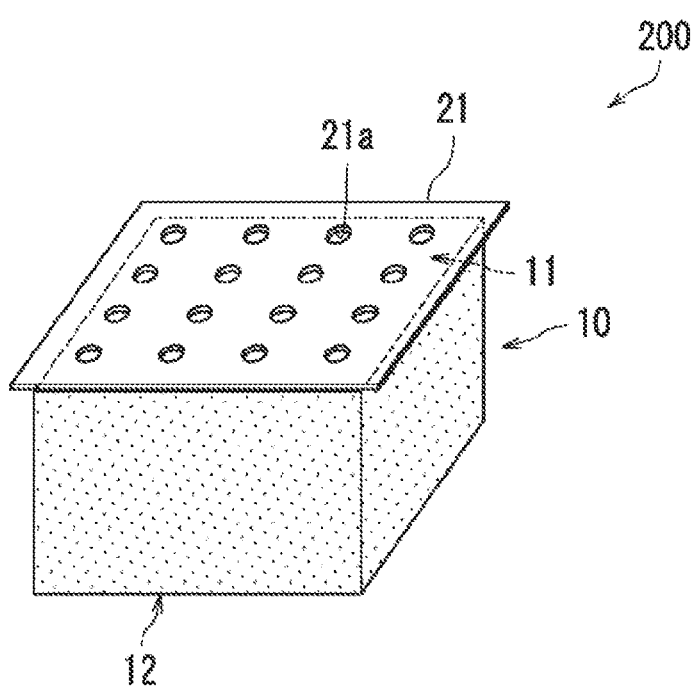
FIG. 5 is a schematic view of a water collecting apparatus according to a second embodiment of the present invention.

A water collecting apparatus 200 according to a second embodiment of the present invention will now be described with reference to FIG. 5. FIG. 5 is a schematic view of the water collecting apparatus 200 according to the second embodiment of the present invention.

As illustrated in FIG. 5, the water collecting apparatus 200 includes the moisture-absorbing material 10, a heat-conducting member 21, the heat source 30 (not illustrated), and the air-blowing unit 40 (not illustrated).

The heat-conducting member 21 is a first modified example of the heat-conducting member 20 (refer to FIG. 1) of the first embodiment. The heat-conducting member 21 includes a plurality of through-holes 21a passing through the heat-conducting member 21. The heat-conducting member 21 has thermal conductivity and is formed of, for example, a metal. The heat-conducting member 21 is manufactured by, for example, forming the plurality of through-holes 21a on a plate-shaped base material. The heat-conducting member 21 is, for example, a punched metal. The heat-conducting member 21 is disposed facing a portion (first surface 11) of the outer surface of the moisture-absorbing material 10. Note that a shape of the through-hole 21a (shape when viewed in plan view) is not particularly limited. The shape of the through-hole 21a can be, for example, a circular shape, an elliptical shape, an oblong hole shape, or a linear shape. Alternatively, the shape of the through-hole 21a may be a polygonal shape or may be a complex shape such as a star shape, for example.

The air current from the air-blowing unit 40 is applied to the moisture-absorbing material 10 through the through-holes 21a. As a result, the moisture-absorbing material 10 in the first state can effectively absorb the moisture in the air.

The heat-conducting member 21 is heated by the heat source 30 in a state in which the moisture-absorbing material 10 in the first state contains moisture. At this time, the temperature of the moisture-absorbing material 10 gradually rises to the predetermined heating temperature from the first surface 11 side toward the second surface 12 side. Thus, in the moisture-absorbing material 10, moisture present on the first surface 11 side of the moisture-absorbing material 10 migrates to the second surface 12 side, and is released from the second surface 12 to outside the moisture-absorbing material 10 (refer to FIG. 4A and FIG. 4B).

Note that the material of the heat-conducting member 21 is not particularly limited as long as a material has high thermal conductivity. For example, the heat-conducting member 21 may be formed of a resin having high thermal conductivity.

Third Embodiment

Figure 6:
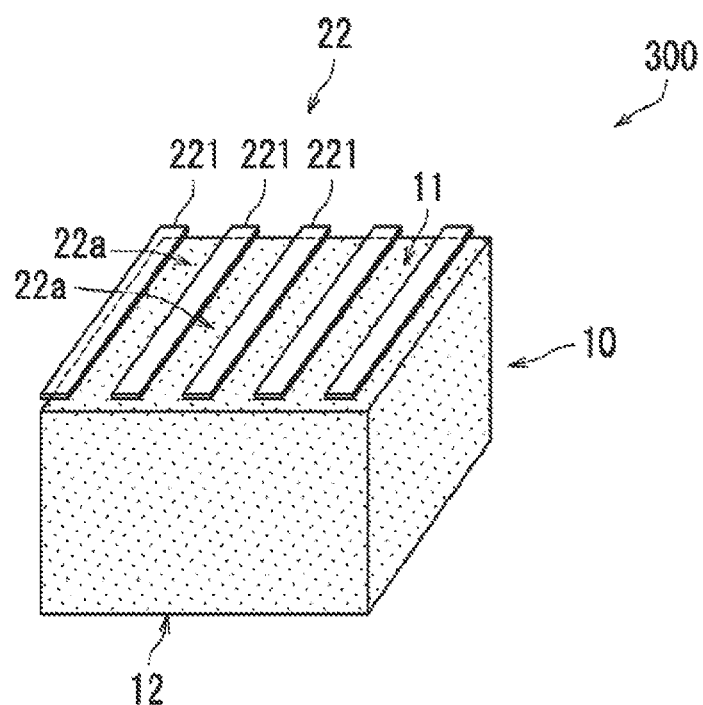
FIG. 6 is a schematic view of a water collecting apparatus according to a third embodiment of the present invention.

A water collecting apparatus 300 according to a third embodiment of the present invention will now be described with reference to FIG. 6. FIG. 6 is a schematic view of the water collecting apparatus 300 according to the third embodiment of the present invention.

As illustrated in FIG. 6, the water collecting apparatus 300 includes the moisture-absorbing material 10, a heat-conducting member 22, the heat source 30 (not illustrated), and the air-blowing unit 40 (not illustrated).

The heat-conducting member 22 is a second modified example of the heat-conducting member 20 (refer to FIG. 1) of the first embodiment. The heat-conducting member 22 has thermal conductivity and is formed of, for example, a metal. The heat-conducting member 22 includes a plurality of metal plates 221. The plurality of metal plates 221 are disposed in parallel with each other at an interval 22a, and are disposed facing a portion (first surface 11) of the outer surface of the moisture-absorbing material 10.

The air current from the air-blowing unit 40 is applied to the moisture-absorbing material 10 through the interval 22a portions of the plurality of metal plates 221. As a result, the moisture-absorbing material 10 in the first state can effectively absorb the moisture in the air.

The heat-conducting member 22 (plurality of metal plates 221) is heated by the heat source 30 in a state in which the moisture-absorbing material 10 in the first state contains moisture. As a result, the moisture contained in the moisture-absorbing material 10 is released from the second surface 12 to outside the moisture-absorbing material 10 (refer to FIG. 4A and FIG. 4B).

Note that the material of the heat-conducting member 22 is not particularly limited as long as a material has high thermal conductivity. For example, the heat-conducting member 22 may be formed of a resin having high thermal conductivity.

Fourth Embodiment

Figure 7A:
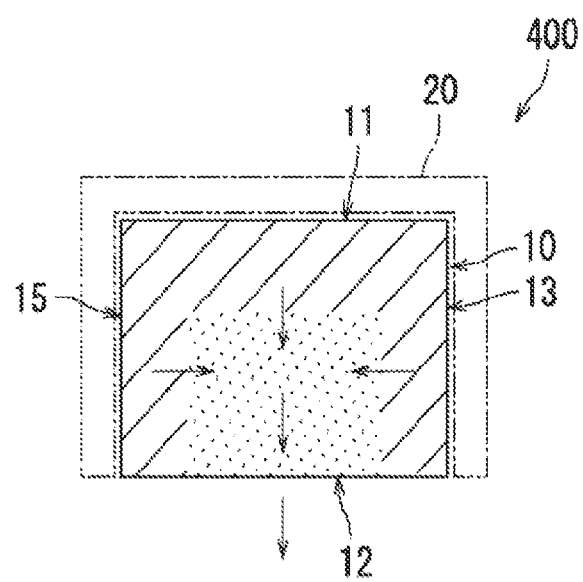
FIG. 7A is a schematic view of a water collecting apparatus according to a fourth embodiment of the present invention.
Figure 7B:
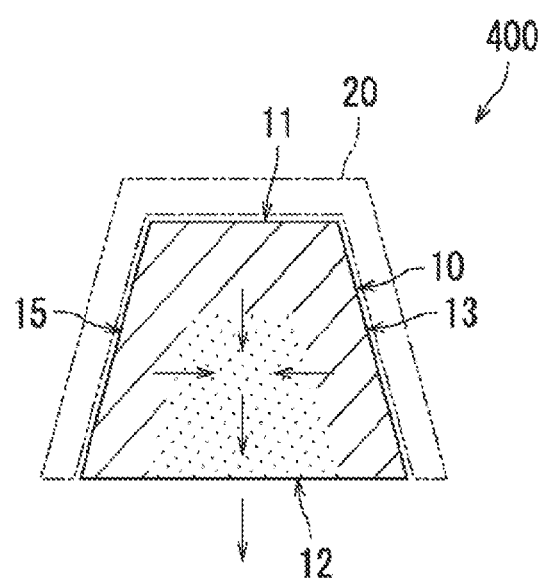
FIG. 7B is a schematic view illustrating a modified example of the water collecting apparatus according to the fourth embodiment of the present invention.

A water collecting apparatus 400 according to a fourth embodiment of the present invention will now be described with reference to FIG. 7A and FIG. 7B. FIG. 7A is a schematic view of the water collecting apparatus 400 according to the fourth embodiment of the present invention.

As illustrated in FIG. 7A, the water collecting apparatus 400 includes the moisture-absorbing material 10, the heat-conducting member 20 (refer to FIG. 1), the heat source 30 (not illustrated), and the air-blowing unit 40 (not illustrated).

The heat-conducting member 20 is disposed facing, of the first surface 11 to the sixth surface 16 (refer to FIG. 1) of the outer surface of the moisture-absorbing material 10, the first surface 11 and the third surface 13 to the sixth surface 16. That is, the heat-conducting member 20 faces, of the outer surface of the moisture-absorbing material 10, the surfaces other than the second surface 12.

The heat-conducting member 20 is heated by the heat source 30, gradually changing the state of the moisture-absorbing material 10 from the first state to the second state, from the first surface 11 side and the surface sides of each of the third surface 13 to the sixth surface 16 of the moisture-absorbing material 10 toward an inner side of the moisture-absorbing material 10. In this way, moisture contained in the moisture-absorbing material 10 migrates to the inner side of the moisture-absorbing material 10, and is collected from a center portion to a lower portion of the moisture-absorbing material 10, promoting an uneven distribution of moisture inside the moisture-absorbing material 10. Subsequently, the collection of moisture toward a center portion of the second surface 12 proceeds and, as a result, water is released from the second surface 12 to outside the moisture-absorbing material 10.

Note that, in the fourth embodiment, the heat-conducting member 21 (refer to FIG. 5) or the heat-conducting member 22 (refer to FIG. 6) may be used instead of the heat-conducting member 20.

Further, in the present embodiment, the orientation of the second surface 12 is downward (direction of gravity), but as described in the first embodiment, the orientation of the second surface 12 is not limited to downward (direction of gravity).

A modified example of the water collecting apparatus 400 will now be described with reference to FIG. 7B. FIG. 7B is a schematic view illustrating a modified example of the water collecting apparatus 400 according to the fourth embodiment of the present invention. As illustrated in FIG. 7B, the moisture-absorbing material 10 may be formed in a frustum shape such as a truncated conical shape or a truncated pyramid shape, for example. With the moisture-absorbing material 10 having a frustum shape, a recovery capacity of the water absorbed can be increased. Specifically, in a case in which the moisture-absorbing material 10 has a frustum shape, the transfer of heat to the center portion of the moisture-absorbing material 10 is increasingly slower in regions closer to the second surface 12 of the moisture-absorbing material 10 in comparison to a case in which the moisture-absorbing material 10 has a prismatic shape. Accordingly, the closer the region is to the second surface 12, the slower the change to the second state in the center portion of the moisture-absorbing material 10. As a result, the change to the second state (hydrophobization) in the center portion of the second surface 12 is slower than in other portions, and the hydrophilicity is maintained to the end. Accordingly, the moisture migrates from other portions to the center portion of the second surface 12, and collects in the center portion of the second surface 12. Further, the center portion of the second surface 12 functions as a water guide path, facilitating the release of water to outside the moisture-absorbing material 10.

Note that, in a case in which the moisture-absorbing material 10 has a frustum shape, it is possible to adjust the amount of released water when the water is released from the second surface 12 to outside the moisture-absorbing material 10 by adjusting an expanse of the frustum. In other words, the moisture-absorbing material 10 can be caused to function as a tap.

Fifth Embodiment

Figure 8:
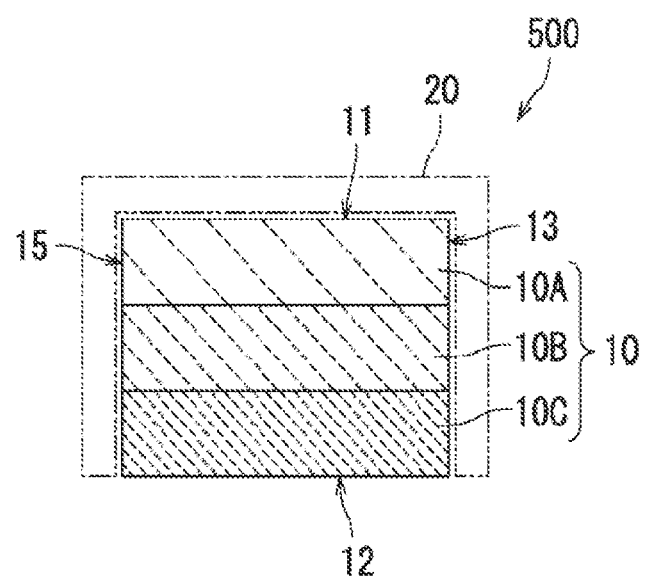
FIG. 8 is a schematic view of a water collecting apparatus according to a fifth embodiment of the present invention.

A water collecting apparatus 500 according to a fifth embodiment of the present invention will now be described with reference to FIG. 8. FIG. 8 is a schematic view of the water collecting apparatus 500 according to the fifth embodiment of the present invention.

As illustrated in FIG. 8, the water collecting apparatus 500 includes the moisture-absorbing material 10, the heat-conducting member 20 (refer to FIG. 1), the heat source 30 (not illustrated), and the air-blowing unit 40 (not illustrated).

The heat-conducting member 20 is disposed facing the first surface 11 and the third surface 13 to the sixth surface 16 of the moisture-absorbing material 10.

The first surface 11 and the third surface 13 to the sixth surface 16 are examples of a facing surface of the present invention. The second surface 12 is an example of a non-facing surface of the present invention.

The moisture-absorbing material 10 includes a plurality of layers. The plurality of layers are layered from the first surface 11 side toward the second surface 12 side.

In the fifth embodiment, the moisture-absorbing material 10 includes a first layer 10A, a second layer 10B, and a third layer 10C. The first layer 10A to the third layer 10C are layered in the order of the first layer 10A, the second layer 10B, and the third layer 10C from the first surface 11 side to the second surface 12 side of the moisture-absorbing material 10.

The first surface 11 is formed in the first layer 10A. The second surface 12 is formed in the third layer 10C.

The third layer 10C is disposed closer to the second surface 12 (non-facing surface) than the first layer 10A is. The first layer 10A is an example of a first layer of the present invention. The third layer 10C is an example of a second layer of the present invention.

The temperatures (lower critical solution temperatures) at which the first layer 10A to the third layer 10C change from the first state to the second state increase in the order of the first layer 10A, the second layer 10B, and the third layer 10C. That is, the moisture-absorbing material 10 has a lower critical solution temperature that increases toward the lower side. Accordingly, the first layer 10A, the second layer 10B, and the third layer 10C become increasingly hydrophilic and more readily absorb moisture in this order. For example, the lower critical solution temperature of the first layer 10A is 40° C., the lower critical solution temperature of the second layer 10B is 45° C., and the lower critical solution temperature of the third layer 10C is 50° C. A lower limit of the temperature at which the state changes from the first state to the second state (lower critical solution temperature) is an example of the temperature at which the degree of hydrophilicity of the polymer compound of the present invention becomes lower than a predetermined standard.

In a case in which the moisture-absorbing material 10 is porous, a total value of the surface areas of all pores desirably decreases in the order of the first layer 10A, the second layer 10B, and the third layer 10C. Specifically, a size of the pores of the first layer 10A to the third layer 10C may decrease in the order of the first layer 10A, the second layer 10B, and the third layer 10C. Note that, more desirably, the number of the pores and the size of the pores of the first layer 10A to the third layer 10C decrease in the order of the first layer 10A, the second layer 10B, and the third layer 10C.

The moisture-absorbing material 10 is increasingly hydrophilic and more readily absorbs moisture as the temperature at which the state changes from the first state to the second state (lower critical solution temperature) increases. Accordingly, when heat is transmitted, moisture is first released from a layer having a low lower critical solution temperature, and the water migrates from the layer having the low lower critical solution temperature to an adjacent layer (layer having a higher lower critical solution temperature and a higher hydrophilicity). For example, water migrates from the first layer 10A to the second layer JOB. Thus, a difference in the lower critical solution temperature or a gradient of the lower critical solution temperature makes it possible to strongly promote water migration associated with heat transfer and prevent a backflow of water.

Further, in a case in which the moisture-absorbing material 10 is porous, the larger the surface area (total value of the surface areas of all pores), the more advantageous for the moisture absorption. On the other hand, the smaller the surface area, the smaller the evaporation loss. Thus, the smaller the surface area, the more readily the moisture-absorbing material 10 releases moisture as liquid water when the state transitions to the second state. Accordingly, by reducing the surface area in the order of the first layer 10A, the second layer 10B, and the third layer 10C, the moisture contained in the moisture-absorbing material 10 can be caused to migrate effectively from the first layer 10A through the second layer 10B, and to the third layer 10C as liquid water when the moisture-absorbing material 10 is heated to the predetermined heating temperature to release the moisture from the moisture-absorbing material 10. As a result, the moisture collected in the third layer 10C can be effectively released as liquid water from the second surface 12 of the third layer 10C to outside the moisture-absorbing material 10 (refer to FIG. 4A and FIG. 4B).

Note that, the larger the surface area of the moisture-absorbing material 10, the higher the evaporation loss during heating and dehydration, but the more readily the moisture-absorbing material 10 absorbs gas and liquid moisture during moisture absorption and water absorption. Thus, with an increase in the surface area of the pores of the first layer 10A, which is likely to be struck by the air current from the air-blowing unit 40, the moisture-absorbing material 10 more readily absorbs moisture in the first layer 10A during the absorption of moisture (water vapor) in the air.

Further, the temperature at which the heat-conducting member 20 is heated may be gradually increased from a temperature near the lower critical solution temperature of the first layer 10A to a temperature greater than or equal to the lower critical solution temperature of the third layer 10C. This makes it possible to reduce the moisture that is lost by evaporation and cannot be collected from the moisture-absorbing material 10 (evaporation loss). In other words, a collection efficiency of liquid water can be further improved. Note that the speed of increasing the temperature at which the heat-conducting member 20 is heated is determined by a thickness of the moisture-absorbing material 10, a composition of the moisture-absorbing material 10, the number of pores, a ratio of a volume occupied by the pores to a volume occupied by a bulk portion, and the like.

Further, in the fifth embodiment, the heat-conducting member 20 may be disposed facing only the first surface 11 as illustrated in FIG. 1 without facing the third surface 13 to the sixth surface 16.

Further, in the fifth embodiment, the heat-conducting member 21 (refer to FIG. 5) or the heat-conducting member 22 (refer to FIG. 6) may be used instead of the heat-conducting member 20.

Further, in the fifth embodiment, the moisture-absorbing material 10 may have a frustum shape. With the moisture-absorbing material 10 having a frustum shape, the recovery capacity of the water absorbed can be increased.

Further, in the fifth embodiment, the moisture-absorbing material 10 includes three layers (first layer 10A to third layer 10C), but the moisture-absorbing material 10 may include two layers, or may include four or more layers.

Further, in the fifth embodiment, the moisture-absorbing material 10 includes a plurality of layers, but the moisture-absorbing material 10 may be configured so that the lower critical solution temperature is gradually changed from the first surface 11 to the second surface 12. The hydrophilicity changes when the lower critical solution temperature changes.

For example, the moisture-absorbing material 10 may be configured so that the lower critical solution temperature increases as the distance to the second surface 12 decreases. According to this configuration, by controlling the degree of change in the lower critical solution temperature from the first surface 11 to the second surface 12, water migration and water collection can be promoted and an amount of moisture released from the second surface 12 per unit time and a rate at which moisture is released from the second surface 12 can be controlled. Furthermore, with this configuration as well, by gradually increasing the temperature at which the heat-conducting member 20 is heated, the evaporation loss can be reduced to further improve the collection efficiency of the liquid water.

Furthermore, in a case in which the moisture-absorbing material 10 is porous, the moisture-absorbing material 10 may be configured so that the surface area decreases as the distance to the second surface 12 decreases. According to this configuration, by controlling a degree of change in the surface area from the first surface 11 to the second surface 12, the absorption of moisture from the first surface 11 can be facilitated and the release of liquid water from the second surface 12 can be facilitated. Additionally, this makes it possible to control the amount of moisture released from the second surface 12 per unit time and the rate at which moisture is released from the second surface 12.

Sixth Embodiment

Figure 9:
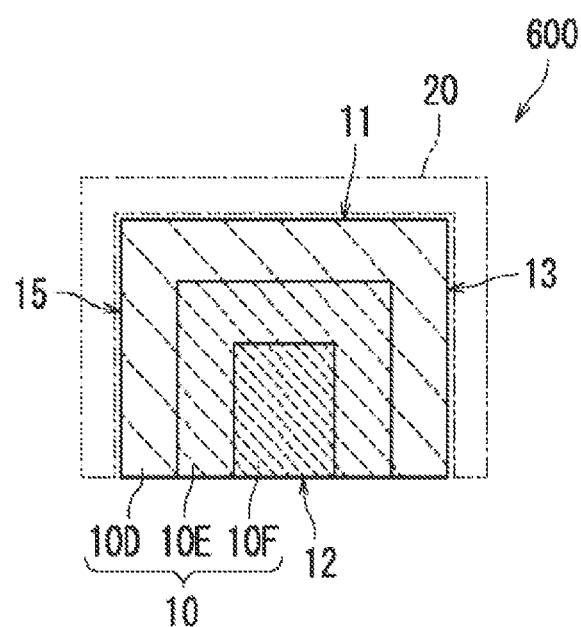
FIG. 9 is a schematic view of a water collecting apparatus according to a sixth embodiment of the present invention.

A water collecting apparatus 600 according to a sixth embodiment of the present invention will now be described with reference to FIG. 9. FIG. 9 is a schematic view of the water collecting apparatus 600 according to the sixth embodiment of the present invention.

As illustrated in FIG. 9, the water collecting apparatus 600 includes the moisture-absorbing material 10, the heat-conducting member 20 (refer to FIG. 1), the heat source 30 (not illustrated), and the air-blowing unit 40 (not illustrated).

The heat-conducting member 20 is disposed facing the first surface 11 and the third surface 13 to the sixth surface 16 of the moisture-absorbing material 10. Hereinafter, the first surface 11 and the third surface 13 to the sixth surface 16 may collectively be referred to as facing surfaces.

The moisture-absorbing material 10 includes a plurality of layers.

In the sixth embodiment, the moisture-absorbing material 10 includes a fourth layer 10D, a fifth layer 10E, and a sixth layer 10F. Of the fourth layer 10D to the sixth layer 10F, the fourth layer 10D is positioned on an outermost side, the fifth layer 10E is positioned inward of the fourth layer 10D, and the sixth layer 10F is positioned inward of the fifth layer 10E. In the fourth layer 10D, the facing surfaces (first surface 11 and third surface 13 to sixth surface 16) facing the heat-conducting member 20 are formed. In the sixth layer 10F, the second surface 12 is formed.

The sixth layer 10F is disposed in a location more spaced apart from the facing surfaces (first surface 11 and third surface 13 to sixth surface 16) than the fourth layer 10D. The fourth layer 10D is an example of the first layer of the present invention. The sixth layer 10F is an example of the second layer of the present invention.

The fourth layer 10D to the sixth layer 10F increase in lower critical solution temperature in the order of the fourth layer 10D, the fifth layer 10E, and the sixth layer 10F. Accordingly, the moisture-absorbing material 10 has a lower critical solution temperature that increases inwardly. Thus, when the moisture-absorbing material 10 is heated to the predetermined heating temperature to release moisture from the moisture-absorbing material 10, the moisture contained in the moisture-absorbing material 10 can be caused to migrate effectively from the fourth layer 10D, through the fifth layer 10E, and to the sixth layer 10F as liquid water. As a result, the moisture collected in the sixth layer 10F (layer having the highest hydrophilicity) can be effectively released as liquid water from the second surface 12 of the sixth layer 10F to outside the moisture-absorbing material 10 (refer to FIG. 4A and FIG. 4B). Furthermore, in a case in which the moisture-absorbing material 10 is porous, increasing the surface area (total value of the surface areas of all pores) from the sixth layer 10F of an innermost shell toward the fourth layer 10D of an outermost shell improves a moisture absorption rate, making it possible to optimize a moisture absorbability and a dehydrability of the moisture-absorbing material 10.

Note that the temperature at which the heat-conducting member 20 is heated may be gradually increased from a temperature near the lower critical solution temperature of the fourth layer 10D to a temperature greater than or equal to the lower critical solution temperature of the sixth layer 10F. As a result, the evaporation loss can be reduced, and the collection efficiency of the liquid water can be further improved.

Further, in the sixth embodiment, the heat-conducting member 21 (refer to FIG. 5) or the heat-conducting member 22 (refer to FIG. 6) may be used instead of the heat-conducting member 20.

Further, in the sixth embodiment, the moisture-absorbing material 10 may have a frustum shape. With the moisture-absorbing material 10 having a frustum shape, the recovery capacity of the water absorbed can be increased.

Further, in the sixth embodiment, the moisture-absorbing material 10 includes three layers (fourth layer 10D to sixth layer 10F), but the moisture-absorbing material 10 may include two layers, or may include four or more layers.

Further, in the sixth embodiment, the moisture-absorbing material 10 includes a plurality of layers, but the moisture-absorbing material 10 may be configured so that the lower critical solution temperature increases as a distance to a center portion of the second surface 12 decreases. According to this configuration, by controlling the degree of change in the lower critical solution temperature from the facing surfaces (first surface 11 and third surface 13 to sixth surface 16) to the center portion of the second surface 12, it is possible to control the amount of moisture released from the center portion of the second surface 12 per unit time and the rate at which moisture is released from the center portion of the second surface 12. Furthermore, because polymers with higher lower critical solution temperatures are more hydrophilic and absorb moisture more readily, by configuring the moisture-absorbing material 10 so that the lower critical solution temperature increases as a distance from the facing surfaces (first surface 11, and third surface 13 to sixth surface 16) increases, moisture can be collected more efficiently and can be released more efficiently. Furthermore, with this configuration as well, by gradually increasing the temperature at which the heat-conducting member 20 is heated, the evaporation loss can be reduced to further improve the collection efficiency of the liquid water.

Furthermore, in a case in which the moisture-absorbing material 10 is porous, the moisture-absorbing material 10 may be configured so that the surface area (total value of the surface areas of the pores) gradually changes from the facing surfaces (first surface 11 and third surface 13 to sixth surface 16) to the center portion of the second surface 12. For example, the moisture-absorbing material 10 may be configured so that the surface area decreases as the distance to the center portion of the second surface 12 decreases. According to this configuration, the degree of change in surface area from the facing surfaces (first surface 11 and third surface 13 to sixth surface 16) to the center portion of the second surface 12 is controlled, making it possible to reduce the evaporation loss while improving the moisture-absorption efficiency.

Figure 10:
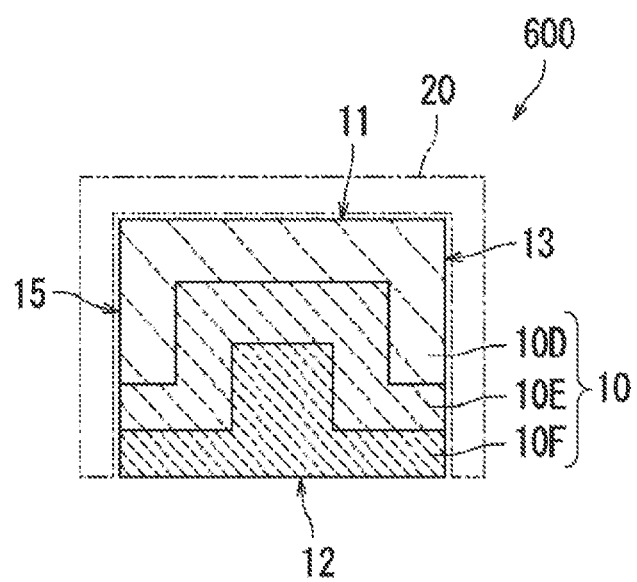
FIG. 10 is a schematic view of the water collecting apparatus according to another embodiment of the present invention.

Further, in the sixth embodiment, a portion (bottom surface) of an outer surface of each of the layers having a lower critical solution temperature that is lower than that of the sixth layer 10F (fourth layer 10D and fifth layer 10E) constitutes a portion of the second surface 12. Therefore, the evaporation loss from the second surface 12 is increased compared to a case in which the second surface 12 is constituted by only an outer surface of the sixth layer 10F. Thus, as illustrated in FIG. 10, for example, the second surface 12 may be constituted by only the outer surface of the sixth layer 10F. FIG. 10 is a schematic view of the water collecting apparatus 600 according to another embodiment of the present invention. According to the water collecting apparatus 600 illustrated in FIG. 10, the evaporation loss from the second surface 12 can be reduced.

Embodiments of the present invention have been described above with reference to the drawings (FIG. 1 to FIG. 10). However, the present invention is not limited to the embodiments described above, and the present invention can be implemented in various modes ((1) to (7), for example) without departing from the gist thereof. Further, the present invention can be made in various forms by appropriately combining a plurality of components disclosed in the embodiments described above. For example, some components may be removed from all of the components described in the embodiments. For easier understanding, the drawings schematically illustrate the respective main components, and the number of illustrated components, or the like may differ from the actual number of components for the sake of convenience in creating the drawings. In addition, each of the components described in the above embodiments is exemplary and is not particularly limited, and various modifications can be made within a range that does not substantially depart from the effects of the present invention.

(1) In the first embodiment to the sixth embodiment and the other embodiment, a heater is used as the heat source 30 that heats the heat-conducting members 20, 21, 22, but the present invention is not limited thereto. The configuration for heating the heat-conducting members 20, 21, 22 is not particularly limited. For example, the heat-conducting members 20, 21, 22 may be heated by irradiating the heat-conducting members 20, 21, 22 with sunlight. In this case, by making a color of the outer surface of the heat-conducting members 20, 21, 22 black, the heat-conducting members 20, 21, 22 can be effectively heated.

(2) In the first embodiment to the sixth embodiment and the other embodiment, the moisture-absorbing material 10 is changed from the first state to the second state by heating the moisture-absorbing material 10, but the moisture-absorbing material 10 may be changed from the first state to the second state by irradiating the moisture-absorbing material 10 with light. Specifically, the moisture-absorbing material 10 may include a photothermal conversion body (particles, or the like). The photothermal conversion body converts light to heat.

In a case in which the moisture-absorbing material 10 having thermal responsiveness includes the photothermal conversion body, the moisture-absorbing material 10 can be changed from the first state to the second state by irradiating the moisture-absorbing material 10 with light. For example, carbon black microparticles can be employed as the photothermal conversion body. In addition, common metal oxides such as silica, alumina, aluminosilicate, titania, zirconia, and iron oxide, or gold nanoparticles, or the like can be used as the photothermal conversion body. Alternatively, although there are difficulties with high temperatures, general cross-linked resin particles such as nylon, poly(methyl methacrylate) (PMMA), silicone, Teflon (trade name), polyethylene, and polystyrene can also be used as the photothermal conversion body under certain conditions. In a case in which the moisture-absorbing material 10 is irradiated with light, the water collecting apparatuses 100, 200, 300, 400, 500, 600 each include a light source such as a lamp, a light-emitting diode (LED), or a laser, for example, instead of the heat source 30 and the heat-conducting members 20, 21, 22.

Note that, in a case in which the moisture-absorbing material 10 includes the photothermal conversion body, the moisture-absorbing material 10 may include the photothermal conversion body only in a portion where light strikes. Alternatively, the moisture-absorbing material 10 may be formed so that the photothermal conversion body becomes less in amount as the distance from the portion where light strikes increases. That is, the moisture-absorbing material 10 may be formed so that the photothermal conversion body decreases in density as the distance from the portion where light strikes increases. Further, in a case in which the moisture-absorbing material 10 includes the photothermal conversion body only in the portion where light strikes, the portion that does not include the photothermal conversion body may include a plurality of layers having thermal responsiveness, as described with reference to FIG. 8 to FIG. 10, for example.

(3) In the first embodiment to the sixth embodiment and the other embodiment, the moisture-absorbing material 10 is changed from the first state to the second state by heating the moisture-absorbing material 10, but the moisture-absorbing material 10 may be changed from the first state to the second state by irradiating the moisture-absorbing material 10 with light. Specifically, a moisture-absorbing material having photoresponsiveness may be used as the moisture-absorbing material 10. The moisture-absorbing material having photoresponsiveness includes a photoresponsive polymer that reversibly changes an affinity with water in response to light. In a case in which a moisture-absorbing material having photoresponsiveness is used as the moisture-absorbing material 10, the moisture-absorbing material 10 can be changed from the first state to the second state by irradiating the moisture-absorbing material 10 with light. Alternatively, the moisture-absorbing material 10 may include a photoresponsive polymer and a temperature-responsive polymer. In this case, the moisture-absorbing material 10 includes the photoresponsive polymer in the portion where light strikes. The photoresponsive polymer generates heat in response to light. This heat causes the temperature-responsive polymer to change from the first state to the second state.

Examples of the photoresponsive polymer include a polymer compound that changes in hydrophilicity or polarity by light, such as azobenzene derivatives, spiropyran derivatives, or the like. Alternatively, the photoresponsive moisture-absorbing material may include a cross-linked body of the photoresponsive polymer. Alternatively, the photoresponsive moisture-absorbing material may include a copolymer of at least one of a temperature-responsive polymer and a pH-responsive polymer, and a photoresponsive polymer, or a cross-linked body of a copolymer thereof. In a case in which the moisture-absorbing material 10 is irradiated with light, the water collecting apparatuses 100, 200, 300, 400, 500, 600 each include a light source such as a lamp, an LED, or a laser, for example, instead of the heat source 30 and the heat-conducting members 20, 21, 22.

Note that in a case in which a moisture-absorbing material having photoresponsiveness is used as the moisture-absorbing material 10, the moisture-absorbing material 10 may be formed so that the photoresponsiveness decreases as a distance from the portion where light strikes increases. Further, in a case in which the moisture-absorbing material 10 includes a photoresponsive polymer only in the portion where light strikes, the portion that does not include the photoresponsive polymer may include a plurality of layers having thermal responsiveness, as described with reference to FIG. 8 to FIG. 10, for example.

(4) In the first embodiment to the sixth embodiment and the other embodiment, the water collecting apparatuses 100, 200, 300, 400, 500, 600 are each configured to include the air-blowing unit 40. Thus, the air current from the air-blowing unit 40 is applied to the moisture-absorbing material 10 in the first state, making it possible to cause the moisture-absorbing material 10 to effectively absorb the moisture in the air. However, the present invention is not limited thereto. The water collecting apparatuses 100, 200, 300, 400, 500, 600 need not include the air-blowing unit 40. That is, the water collecting apparatus 100, 200, 300, 400, 500, 600 may each be configured so that the moisture-absorbing material 10 in the first state absorbs moisture from the air that naturally comes into contact with the outer surface of the moisture-absorbing material 10. This makes it possible to simplify the apparatus configuration of the water collecting apparatuses 100, 200, 300, 400, 500, 600.

(5) The application of the water collecting apparatuses 100, 200, 300, 400, 500, 600 is not particularly limited. The water collecting apparatuses 100, 200, 300, 400, 500, 600 may each be, for example, used in a dehumidifier, used as a beverage water collecting apparatus that collects beverage water, or as an apparatus for collecting water for applications other than drinking. For example, the water collecting apparatuses 100, 200, 300, 400, 500, 600 may each be used as a gardening water collecting apparatus that collects water for gardening. Note that in a case in which the water collecting apparatuses 100, 200, 300, 400, 500, 600 are each used as a beverage water collecting apparatus, the beverage water collecting apparatus may be configured so that a filtration device is separately added and the water collected by the water collecting apparatuses 100, 200, 300, 400, 500, 600 is purified by the filtration device before being provided as beverage water.

(6) In the first embodiment to the sixth embodiment and the other embodiment, the moisture-absorbing material 10 has a substantially prismatic shape or a frustum shape, but the shape of the moisture-absorbing material 10 is not particularly limited. For example, the moisture-absorbing material 10 may have a cylindrical shape, a sheet shape, a particle shape, or a spherical shape.

(7) In the first embodiment to the sixth embodiment and the other embodiment, a portion of the moisture-absorbing material 10 that releases moisture (second surface 12) may have an inclined shape that protrudes while tapered. As a result, when moisture is released from the moisture-absorbing material 10, the moisture can be collected in the portion having the inclined shape of the moisture-absorbing material 10, and the moisture can be effectively released from a tip end portion of the portion having the inclined shape.

INDUSTRIAL APPLICABILITY

The present invention has applicability in the field of a water collecting apparatus and a water collecting method.

REFERENCE SIGNS LIST

10 Moisture-absorbing material
20, 21, 22 Heat-conducting member
20a, 21a Through-hole
30 Heat source
40 Air-blowing unit
100 Water collecting apparatus

The invention claimed is:

1. A water collecting apparatus comprising:
a moisture-absorbing material including a polymer compound having a property in which a degree of hydrophilicity changes with changes in temperature; and
a heat-conducting member disposed facing a portion of an outer surface of the moisture-absorbing material and having a thermal conductivity,
wherein the heat-conducting member has an air-conducting unit configured to allow an air current to be applied to the outer surface of the moisture-absorbing material.

2. The water collecting apparatus according to claim 1, wherein the heat-conducting member is disposed such that another portion of the outer surface of the moisture-absorbing material is left exposed.

3. The water collecting apparatus according to claim 1, wherein the portion of the outer surface of the moisture-absorbing material and another portion of the outer surface of the moisture-absorbing material are collinearly positioned.

4. The water collecting apparatus according to claim 1, wherein the heat-conducting member includes, as the air-conducting unit, a through-hole passing through the heat-conducting member.

5. The water collecting apparatus according to claim 1, wherein the heat-conducting member is formed in a mesh shape.

6. The water collecting apparatus according to claim 1, wherein the outer surface of the moisture-absorbing material includes a plurality of surfaces, and
the heat-conducting member is disposed facing all but one surface of the plurality of surfaces.

7. The water collecting apparatus according to claim 1, wherein the outer surface of the moisture-absorbing material includes;
a facing surface positioned on a side facing the heat-conducting member, and
a non-facing surface positioned on another side not facing the heat-conducting member.

8. The water collecting apparatus according to claim 7, wherein the moisture-absorbing material is porous,
the moisture-absorbing material includes;
a first layer, and
a second layer having a smaller surface area than the first layer, and
the second layer is disposed closer to the non-facing surface or is disposed in a location farther away from the facing surface than the first layer is.

9. A water collecting apparatus comprising:
a moisture-absorbing material including a polymer compound having a property in which a degree of hydrophilicity changes with changes in temperature; and
a heat-conducting member disposed facing a portion of an outer surface of the moisture-absorbing material and having a thermal conductivity,
wherein the outer surface of the moisture-absorbing material includes:
a facing surface positioned on a side facing the heat-conducting member, and
a non-facing surface positioned on another side not facing the heat-conducting member,
the moisture-absorbing material includes:
a first layer, and
a second layer being higher than the first layer in temperature at which the degree of hydrophilicity of the polymer compound is higher than a predetermined threshold, and the second layer is disposed closer to the non-facing surface or is disposed in a location farther away from the facing surface than the first layer is.

10. A water collecting apparatus comprising:
a moisture-absorbing material including a polymer compound having a property in which a degree of hydrophilicity changes with temperature; and
a light source configured to irradiate the moisture-absorbing material with light,
wherein the moisture-absorbing material includes, at a portion where light strikes, a photothermal conversion body configured to convert light into heat, and
an amount of the photothermal conversion body included in the moisture-absorbing material decreases as a distance from the portion where light strikes increases.

11. A water collecting apparatus comprising:
a moisture-absorbing material including a photoresponsive polymer compound having a property in which a degree of hydrophilicity changes with light; and
a light source configured to irradiate the moisture-absorbing material with light,
wherein the photoresponsive polymer compound is included in a portion, of the moisture-absorbing material, where light strikes,
the moisture-absorbing material further includes a temperature-responsive polymer compound having a property in which a degree of hydrophilicity changes with changes in temperature, and
the photoresponsive polymer compound generates heat in response to light.

* * * * *